United States Patent [19]
Tank et al.

[11] Patent Number: 5,311,273
[45] Date of Patent: May 10, 1994

[54] METHOD AND APPARATUS FOR CALIBRATING SPECTRAL RADIOMETERS

[75] Inventors: Volker Tank, Eching; Peter Haschberger, Gauting; Helmut Dietl, Munich; Erwin Lindermeier, Augsburg, all of Fed. Rep. of Germany

[73] Assignee: Deutsche Forschungsanstalt für Luft- und Raumfahrt e.V., Cologne, Fed. Rep. of Germany

[21] Appl. No.: 936,483

[22] Filed: Aug. 28, 1992

[30] Foreign Application Priority Data

Aug. 30, 1991 [DE] Fed. Rep. of Germany ....... 4128912

[51] Int. Cl.$^5$ .............................................. G01J 3/28
[52] U.S. Cl. ...................... 356/43; 356/243
[58] Field of Search ................. 356/346, 243, 43; 250/252.1 A

[56] References Cited

U.S. PATENT DOCUMENTS 4,974,182  11/1990  Tank ................................. 250/341

FOREIGN PATENT DOCUMENTS

0301290A1  1/1989  European Pat. Off. .
3042300A1  8/1980  Fed. Rep. of Germany .
9104471    9/1990  World Int. Prop. O. .

Primary Examiner—Richard A. Rosenberger
Attorney, Agent, or Firm—Browdy and Neimark

[57] ABSTRACT

A method and an apparatus are provided for calibrating a spectrometer, in particular a Fourier transform spectrometer (FTS), in particular for the infrared spectral range. At least four black body radiators of different temperatures are provided, which are arranged horizontally, i.e. parallel to the surface of the earth, thereby avoiding temperature gradients due to convection. The temperature of the at least four radiators is determined by means of the calibrating method without a separate measurement. In the method according to the invention, at the same time the absorption of the atmosphere is considered as a characteristic of the spectrometer, thereby eliminating separate measurement and correction thereof. In addition, for Fourier transform spectrometers the calibration is carried out by means of complex spectra.

9 Claims, 2 Drawing Sheets

METHOD AND APPARATUS FOR CALIBRATING SPECTRAL RADIOMETERS

BACKGROUND OF THE INVENTION

1. Field of the Invention

The invention relates to a method and apparatus for calibrating spectral radiometers, in particular Fourier spectrometers (i.e. Michelson interferometers) with the aid of black radiators, preferably in the infrared spectral range.

2. Description of the Prior Art

Spectral radiometers, which will be referred to for simplicity hereinafter as "spectrometers", are employed inter alia also for measuring absolute radiation quantities, such as the "spectral radiance" or the "spectral radiant intensity". Absolute radiation quantities are the requirement for derivatives made therefrom of other absolute quantities, for example temperature, emittance or concentrations of the components of gas mixtures. Such absolute radiation quantities are obtained from the measuring signals of the spectrometers via a calibration.

The measuring signal of a spectrometer, i.e. the measured spectrum thereof, can be described by the following equation:

$$S(\nu) = \tau(\nu) R(\nu) (L(\nu) + G(\nu)) \quad (1)$$

where $\nu$ denotes the wave number, $\tau(\nu)$ the spectral transmittance of the atmosphere between spectrometer and measured object, $S(\nu)$ a measured spectrum, $R(\nu)$ the spectral sensitivity of the spectrometer, $L(\nu)$ the spectral radiance of the object and $G(\nu)$ the effective spectral radiance of the spectrometer housing (inner). The spectral radiance $L(\nu)$ of the measured object is obtained by transformation as:

$$L(\nu) = \frac{S(\nu)}{\tau(\nu) R(\nu)} - G(\nu) \quad (2)$$

Quantitatively, the spectral radiance $L(\nu)$ of the object can be determined only when the values of $\tau(\nu)$, $R(\nu)$ and $G(\nu)$ are known. Whereas the spectral transmittance $\tau(\nu)$ of the atmosphere varies with time and location and depends on the length of the measurement distance, the spectrometer's spectral sensitivity $R(\nu)$ and the effective spectral radiance of the spectrometer housing $G(\nu)$ are measuring apparatus parameters and thus to be treated as quantities which are constant during finite periods of time. To determine the radiance of a measured object the spectral transmittance $\tau(\nu)$ of the atmosphere is determined from additional measurements whilst the apparatus parameters $R(\nu)$ and $G(\nu)$ result from the calibration.

As described by B. J. Vastag, S. R. Horman in the article "Calibration of a Michelson interferometer spectrometer" in SPIE Vol 289 1981, Fourier Transform Infrared Spectroscopy (1981), the hitherto usual calibration is carried out by means of black body radiators at two different temperatures in accordance with the relationship given below (the calibration likewise used at only one temperature is expedient only in a few specific cases and will consequently not be considered in detail below):

$$S_h(\nu_i) = R(\nu_i)(L(\nu_i, T_h) + G(\nu_i)) \quad (3)$$

where $T_h$ denotes the temperature of a calibrating radiator. For $i = 1, 2, 3 \ldots, n$ and for $h = 1, 2$ all apparatus parameters $R(\nu)$ and $G(\nu)$ can be determined therefrom, on condition that the temperatures $T_h$ are known. The temperatures are measured via contact sensors in the interior or on the surface of the black body radiators. For such a radiance calibration extended area radiators are used having an area completely covering that of the aperture of the spectrometer. Usual areas are areas having edge lengths of 10 cm × 10 cm to 60 cm × 60 cm. The radiators are arranged perpendicularly to the surface of the earth because the optical axis of the spectrometers are usually aligned parallel to the earth surface; slight deviations are adjustable downwardly and correspondingly large deviations upwardly.

The two temperatures $T_h$ of the calibrating radiators are set so that the radiation intensity to be expected, i.e. the radiance or radiant intensity of the measured object, lies between the radiation intensities of the two radiators.

In this conventional calibration the transmittance $\tau(\nu)$ of the atmosphere is assumed to be negligible or the ranges in which the transmittance is not negligible are excluded and interpolated in the calibration spectra.

If the spectrometer is a Fourier transform spectrometer (FTS), the primary measuring signal thereof is a so-called "interferogram" which is transferred by a mathematical Fourier transformation to a secondary measuring signal, the (uncalibrated) spectrum. Due to the measuring method the interferogram is an asymmetrical function; it thus provides on Fourier transformation a complex spectrum consisting of real and imaginary component or magnitude and phase. In reality of course the spectrum of the radiation is real; from the complex spectrum the real amount spectrum is therefore determined and then further employed.

Disadvantageous with this calibrating method is that 1. the black radiators are perpendicularly upright and thus subject to convection, the surface temperatures thereof therefore having a gradient of a few Kelvin from the lower edge to the upper edge;
2. the temperature of the black body radiators are measured via (error-prone) contact sensors;
3. the transmittance $\tau(\nu)$ of the atmosphere is not detected and must be determined by additional measurements and
4. in the calculation of amount or absolute value spectra of the apparatus parameters $R(\nu_i)$ and $G(\nu_i)$ for determining spectral radiances of the measured objects the information on the phase is no longer contained. This can then lead to an incorrect sign of the spectra or individual points of the spectra, particularly when the temperature and the radiance of the measured object is less than the temperature or radiance of the spectrometer, this leading to a reversal of the radiation flux. Also, such errors can possibly occur by any transit time differences present in the electronics of the interferometer, caused for example by the phase response of the electrical filters necessary.

SUMMARY OF THE INVENTION

The invention therefore has as its object the provision of a method and apparatus for calibrating spectrometers in which the temperature is measured free of error by black body radiators not subjected to convection leading to temperature gradients and the spectra determined always have the correct sign in all points.

The invention therefore proposes in a method for calibrating spectral radiometers, in particular Fourier spectrometers, with the aid of black body radiators, the improvement in which from measured spectra of at least four black body radiators aligned parallel to the surface of the earth and held constant at respective different temperatures four different groups of different spectra of three radiators in each case are formed;

from each of the four different groups of different spectra by a least square fit the spectral sensitivity ($R(\nu_i)$), the spectral inherent radiation from the apparatus ($G(\nu_i)$) and the respective three radiator temperatures ($T_h$) are determined, and in the presence of the spectra of n(n>3) wave numbers ($\nu$) the results of the four groups each of three different spectra are compared with each other, a calibration being considered reliable when the results for the spectral sensitivity ($R(\nu_i$ and the spectral inherent radiation ($G(\nu_i)$) and the four different radiator temperatures ($T_h$) coincide in the order of magnitude of the measuring inaccuracy of the spectrometer.

The invention also proposes in an apparatus for calibrating spectral radiometers, in particular Fourier spectrometers, with the aid of black body radiators, the improvement in which at least four circular black body radiators held constant at different temperatures ($T_h$) and arranged parallel to the surface of the earth so that they emit their radiation upwardly can be consecutively positioned beneath a stationary plane mirror, the mirror surface of which encloses an angle of 45° both with the radiator surfaces and with the aperture opening of the spectrometer to be calibrated, the surface of the plane mirror being so dimensioned that it is greater than the projection onto the radiator surfaces, and the area of the radiators again covering the circular aperture area of the spectrometer to be calibrated so that the radiation of each of the positioned black radiators is reflected into the optical system of the spectrometer to be calibrated.

According to the invention, in the apparatus for calibrating spectrometers at least four black body radiators are provided which are not arranged vertically as hitherto but are aligned parallel to the surface of the earth so that they emit their radiation only upwardly. As a result, the convection is the same over the entire area and the temperature of the black body radiators therefore homogeneous. At least four black body radiators are mounted on a common carrier, either at equal angular intervals on an imaginary circle circumference or linearly adjacent each other, in such a manner that they can be displaced in a circular or linear movement.

Furthermore, in the apparatus according to the invention above the black body radiators a plane mirror is arranged stationarily in such a manner that the mirror surface thereof encloses an angle of 45° with the surfaces of the radiator arranged parallel to the surface of the earth. The dimensions of the plane mirror here are chosen so that on projection onto the radiator surface the latter is reliably covered (the area of the black body radiators is so dimensioned that they in turn easily cover the aperture area of a spectrometer to be calibrated). When the at least four black body radiators are now consecutively positioned beneath the plane mirror, the radiation thereof is reflected via the plane mirror arranged at 45° in the horizontal direction into the optical system of the correspondingly aligned spectrometer to be calibrated. Said spectrometer then picks up the respective spectrum, which is stored in a computer.

During a measuring section the preferably at least four radiators have temperatures which are to be regarded as constant. One of the temperatures of one radiator may be equal to the ambient temperature or lie close to the latter (the temperature of one radiator may for example also be set beneath the ambient temperature by cooling). This enables in the subsequent measurements the very important case to be handled in which the radiation flux runs in the entire spectral range or in parts thereof from the spectrometer to the measured object. This case also occurs whenever ambient radiation reflected at the measured object is also measured, this being almost always the case in practice. The other three temperatures of the remaining radiators are so selected that they lie below, above and in the vicinity of the brightness temperature to be expected of a measured object, i.e. the three radiators have different temperatures.

The brightness temperature of a measured object is then the temperature which a black radiator has which has the same radiance as the measured object.

Temperature differences are adjusted in dependence upon the temperature resolution of the spectrometer used in such a manner that the difference of two spectra from two radiators of different temperature has a good signal/noise ratio (i.e. at least 10:1, or even better 100:1 or more); here, the differences lie in the range of a few 10K to a few 100K.

In the method according to the invention for calibrating a spectrometer, from four measured different spectra from at least four parallel radiators four different groups each of three different spectra are formed, the individual spectra being described by the equation (1) set forth at the beginning. For each of the four groups of different spectra, by a least square fit calculation the spectral sensitivity $R(\nu_i)$, the effective spectral radiance $G(\nu_i)$ of the spectrometer housing and in each case three radiator temperatures $T_h$ are determined. Such a determination of the quantities set forth above is possible when the spectra for n wave numbers are present, where n must be greater than three and n as a rule is a few 10 up to a few 100,000.

The results of the four groups each of three spectra are subsequently compared with each other. The calibration here is reliable only when the results for the spectral sensitivity $R(\nu)$ of the spectrometer and for the effective spectral radiance $G(\nu_i)$ of the spectrometer housing as well as the four radiator temperatures $T_h$ coincide within the range of the measuring inaccuracy of the spectrometer. According to the invention, no additional measurements need be made to determine the temperature of the individual black radiators. Such additional measurements, for example with the aid of contact temperature sensors, may be carried out simply for checking the temperature setting.

According to an advantageous further development of the invention the black radiators are arranged at the same distances from the spectrometer to be calibrated as an object subsequently to be measured. As a result, in a calibration carried out by means of the method according to the invention spectral ranges are then also included which have high atmospheric radiation absorption, as encountered for example around $\nu = 2340$ cm$^{-1}$ ($\lambda = 4,25$ $\mu$m, due to $CO_2$) and around $\nu = 1428$ cm$^{-1}$ ($\lambda = 7,0$ $\mu$m due to $H_2O$), In contrast to the conventional calibrating methods in which these ranges are excluded and if necessary must be interpolated, this means that according to the invention all the measured spectral elements are employed. The properties of the atmosphere are considered here as if they were properties of the spectrometer. This gives the spectral sensitivity of the spectrometer $\tau(\nu) R(\nu)$, providing the spectral radiance $L(\nu)$ of a measured object in accordance with equation (2) given at the beginning. Consequently, with such a calibration the influences of the atmosphere are also corrected.

With the invention, in a calibration carried out according to the method of the invention with the aid of the apparatus of the invention, providing that the spectrometer is a Fourier transform spectrometer (FTS) the spectral sensitivity $R(\nu_i)$ of the spectrometer and the effective spectral radiance $G(\nu_i)$ of the spectrometer are determined and stored as complex quantities consisting of real and imaginary part (the absolute value spectra are determined simply for control purposes). Furthermore, according to the invention the object spectra $S(\nu_i)$ are determined and stored as complex quantities consisting of real and imaginary component (in this case as well the absolute value spectra are again determined for control purposes).

The determination of the spectral radiance $L(\nu)$ of a measured object is carried out according to equation (2) with the aid of the complex quantities and the final absolute value spectrum or amount spectrum formed only after conclusion of these operations. In this manner the information on the phase is not lost; the spectra determined thus have the correct sign in all points, even when the temperature or the radiance of the measured object is smaller than the temperature or the radiance of the spectrometer, i.e. the radiation flux in the entire spectrum or in parts thereof is in the reverse direction, i.e. from the spectrometer to the measured object. This then also avoids errors which might arise due to transit time differences possibly present in the electronics of the interferometer, such transit time differences for example possibly being caused by the phase response of the electrical filters necessary.

BRIEF DESCRIPTION OF THE DRAWINGS

The invention will be described in detail hereinafter with the aid of preferred embodiments with reference to the accompanying drawings, wherein.

DESCRIPTION OF THE PREFERRED EMBODIMENTS

Figure 1:
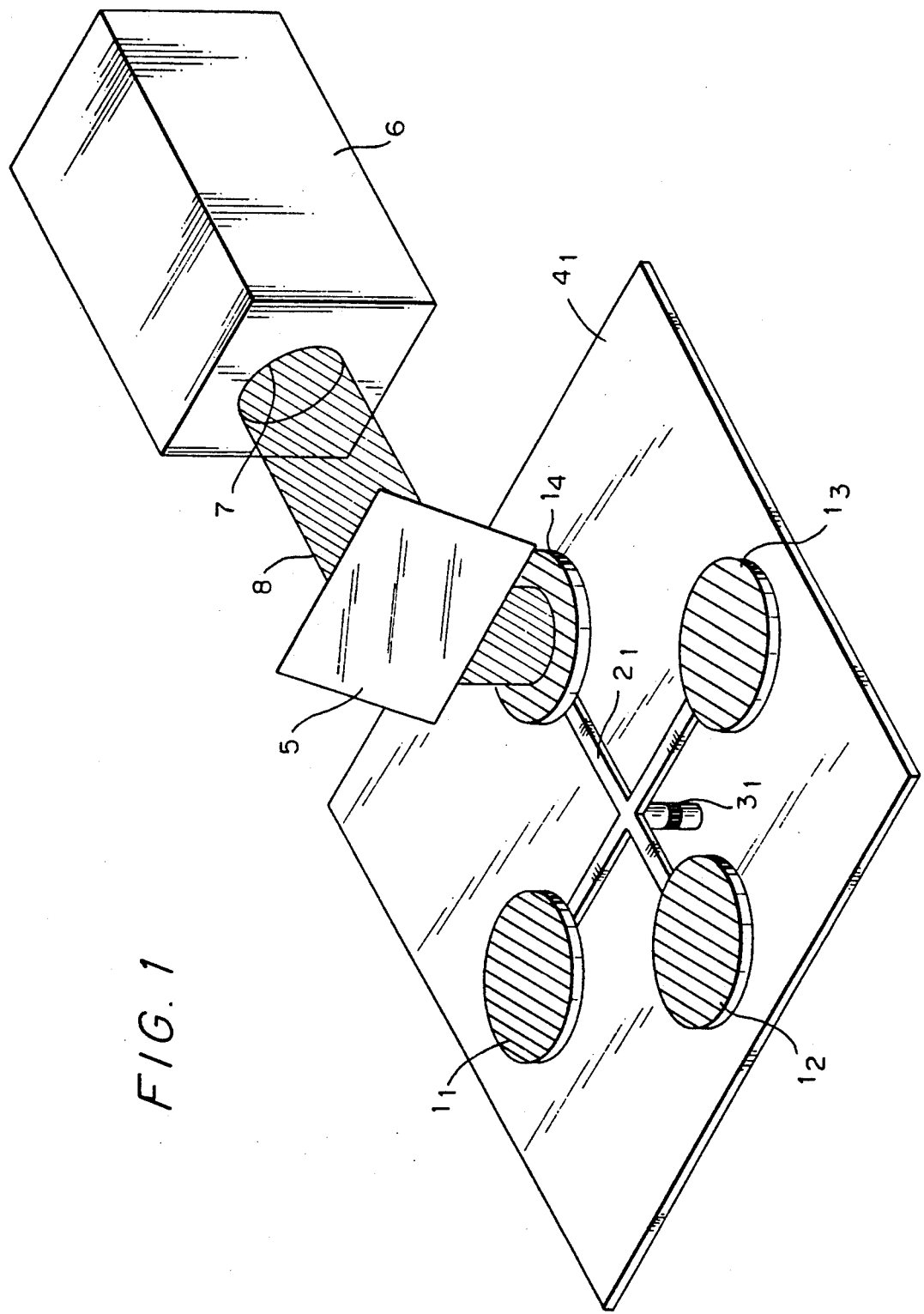
FIG. 1 shows a schematic illustration of an embodiment of an apparatus for calibrating a spectrometer having four black body radiators which are arranged at equal angular intervals along an imaginary circumferential line of a circle and FIG. 2 shows a schematic illustration of another embodiment of an apparatus for calibrating spectrometers also having four radiators arranged at equal intervals adjacent each other.

In FIG. 1 an apparatus for calibrating a spectrometer 6, referred to for simplicity hereinafter also as calibrating apparatus, comprises tour calibrating radiators in the form of four black radiators $1_1$ to $1_4$, the effective surface of which is enlarged by grooves, as indicated by lines running parallel to each other on the individual radiators. The four radiators $1_1$ to $1_4$ are arranged on a cross-shaped holder $2_1$ having equal legs at the same angular interval along an imaginary circular circumferential line. Between the holder $2_1$ and a support plate $4_1$ substantially square in FIG. 1 a schematically indicated ball bearing $3_1$ is provided so that the holder $2_1$ and thus the radiators $1_1$ to $1_4$ arranged thereon are rotatable with respect to the stationary support plate $4_1$. In a manner not shown in detail a deflecting mirror 5 in the form of a plane mirror is arranged on the support plate $4_1$ at an angle of 45° with respect to the surface of the individual black radiators $1_1$ to $1_4$.

The individual radiators $1_1$ to $1_4$ can be positioned consecutively beneath the plane deflecting mirror 5 by rotating the cross-shaped holder $2_1$. For example, in FIG. 1 the black radiator $1_4$ is arranged beneath the plane mirror 5. The radiation eminating from the radiator $1_4$ is indicated for example by a beam 8 shown hatched. Said beam 8 is deflected by a deflecting mirror 5 into the inlet or aperture opening 7 of the spectrometer 6.

Figure 2:
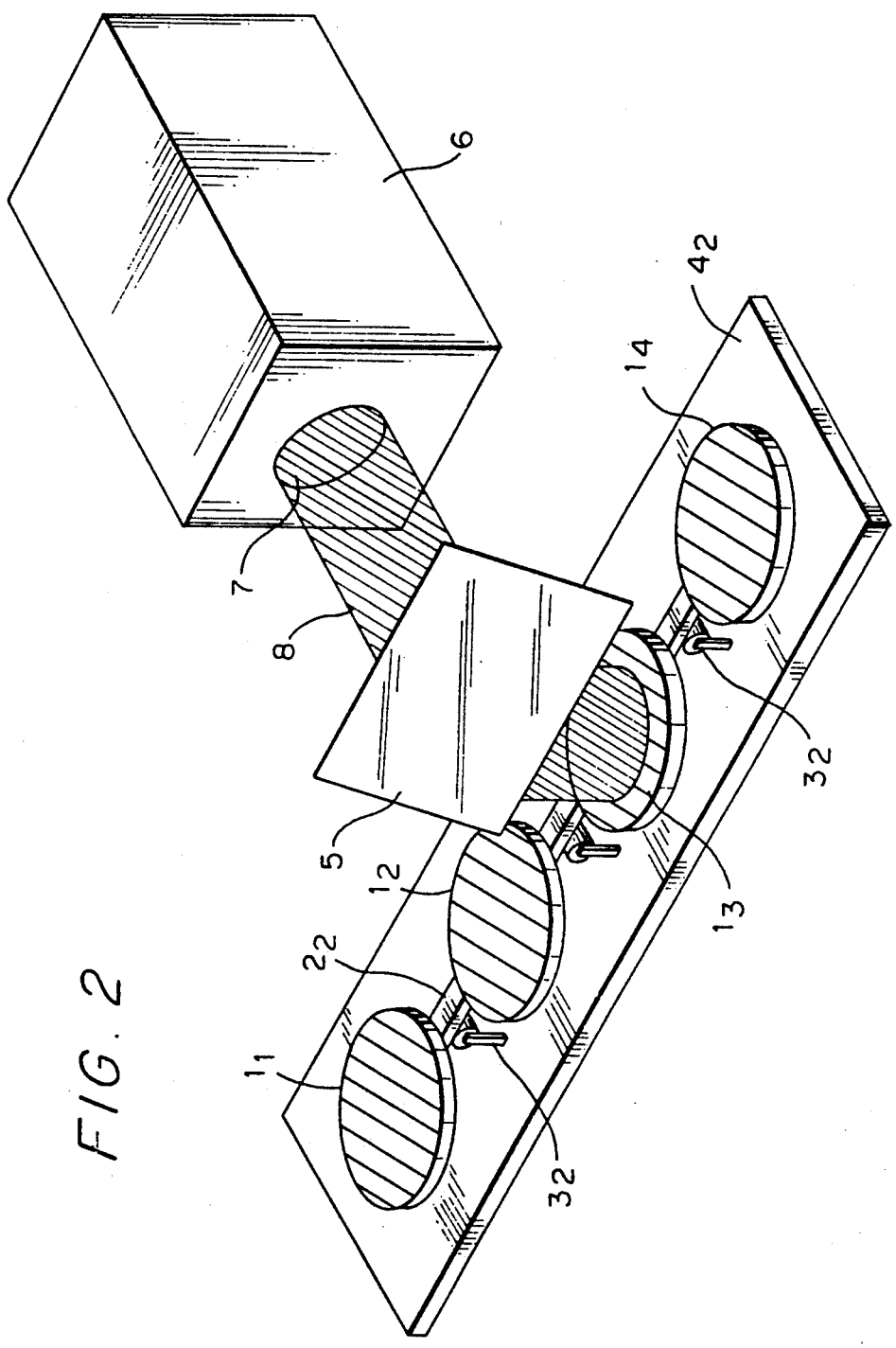

In FIG. 2 a further embodiment of a calibrating apparatus is illustrated which again also comprises four calibrating radiators in the form of four black radiators $1_1$ to $1_4$, the effective surface of which is again increased by grooves. The four black radiators $1_1$ to $1_4$ are mounted adjacent each other at equal intervals on a holder $2_2$. The holder $2_2$ is linearly displaceable on a support plate, rectangular in FIG. 2, via schematically indicated rolling or sliding bearings $3_2$. The deflecting mirror 5 is again secured to the support plate $4_2$, this not being shown in detail in FIG. 2. The black radiators $1_1$ to $1_4$ can be consecutively positioned by linear displacement of the holder $2_2$ beneath the deflecting mirror 5. In FIG. 2 for example the radiator $1_3$ is positioned beneath the mirror 5. In FIG. 2 as well, the radiation from the radiator $1_3$, which is likewise indicated by the beam 8, is deflected from the deflecting mirror 5 into the inlet or aperture opening 7 of the spectrometer 6.

Radiators, deflecting mirrors and spectrometers may also be arranged in a different manner. For example, in FIG. 2 the support plate $4_2$ can be arranged turned through 90° in the plane of the drawing and the mirror 5 can be moved in the direction of an imaginary connecting line through the four radiators $1_1$ to $1_4$ in a horizontal direction over the radiators so that in this manner the particular radiation of a radiator disposed beneath the mirror is deflected into the spectrometer aperture 10. Compared with the arrangement described above, in which the support plate is turned through 90° in the plane of the drawing of the holding plate $4_2$ shown in FIG. 2, the arrangements according to FIGS. 1 and 2 have the advantage that the path and thus the radiation absorption through the atmosphere between the particular radiators $1_1$ to $1_4$ arranged beneath the mirror 5 and the spectrometer aperture 7 are identical.

In a modification of the arrangements described, in a calibrating apparatus the deflecting mirror 5 may also be omitted. In such a case, the calibrating radiators $1_1$ to $1_4$ arranged horizontally adjacent each other in FIG. 2 may be provided with a hinge or joint mechanism; by means of such a mechanism for a calibration the individual radiators $1_1$ to $1_4$ are brought for a short time perpendicularly in front of the aperture opening 7 and thus in front of the optical system of the spectral radiometer 6.

We claim:

1. A method for calibrating spectral radiometers, with the aid of black body radiators, wherein
   from measured spectra of at least four black radiators ($1_1$ to $1_4$) aligned parallel to the surface of the earth and held constant at respective different temperatures four different groups of different spectra of three radiators ($1_1, 1_2, 1_3$; $1_2, 1_3, 1_4$; $1_3, 1_4, 1_1$ and $1_4$, $1_1, 1_2$ in each case are formed;
   from each of the four different groups of different spectra by a least square fit the spectral sensitivity ($R(\nu_i)$), the spectral inherent radiation from the apparatus ($G(\nu_i)$) and the respective three radiator temperatures ($T_h$) are determined, and in the presence of the spectra of $n(n>3)$ wave numbers ($\nu$) the results of the four groups each of three different spectra are compared with each other, a calibration being considered reliable when the results for the spectral sensitivity ($R(\nu_i)$) and the spectral inherent radiation ($G(\nu_i)$) and the four different radiator temperatures ($T_h$) coincide in the order of magnitude of the measuring inaccuracy of the spectrometer.

2. A method according to claim 1, wherein of the four different constant temperatures of the four radiators ($1_1$ to $1_4$) one of the temperatures is equal to the ambient temperature or close to the latter and the other three constant temperatures are chosen beneath, above and in the vicinity of the expected temperature of the measured object, the temperature differences being adjusted in dependence upon the temperature resolution of the spectrometer in such a manner that the difference of the spectra of two radiators of different temperature has a good signal/noise ratio.

3. A method according to claim 1, wherein a temperature of a radiator is set beneath the ambient temperature.

4. A method according to claim 1 for use in a Fourier transform spectrometer, wherein the spectral sensitivity ($R(\nu_i)$) and the spectral inherent radiation ($G(\nu_i)$) of the apparatus are determined and stored as complex quantities consisting of real and imaginary component;

the object spectra ($S(\nu_i)$) of a measured object are also determined and stored as complex quantities consisting of real and imaginary component;

all the necessary computing operations to obtain desired measured values are carried out with the complex quantities of the calibrating spectra and the spectra of the measured object, and the final absolute value spectrum is not formed until after conclusion of these operations.

5. An apparatus for calibrating spectral radiometers, with the aid of black body radiators, wherein at least four circular black body radiators ($1_1$ to $1_4$) held constant at different temperatures ($T_h$) and arranged parallel to the surface of the earth so that they emit their radiation upwardly can be consecutively positioned beneath a stationary plane mirror (5), the mirror surface of which encloses an angle of 45° both with the radiator surfaces and with the aperture opening of the spectrometer (6) to be calibrated, the surface of the plane mirror (5) being so dimensioned that it is greater than the projection onto the radiator surfaces, and the area of the radiators ($1_1$ to $1_4$) again covering the circular aperture area of the spectrometer (6) to be calibrated so that the radiation of each of the positioned black body radiators is reflected into the optical system of the spectrometer to be calibrated.

6. An apparatus according to claim 5, wherein the at least four black body radiators ($1_1$ to $1_4$) are mounted at equal angular intervals along an imaginary circle circumferential line on a holder ($2_1$) which ($2_1$) is mounted rotatably so that the black body radiators ($1_1$ to $1_4$) can be positioned consecutively beneath the stationary plane mirror (5).

7. An apparatus according to claim 5, wherein the at least four black body radiators ($1_1$ to $1_4$) are mounted at equal intervals adjacent each other on a holder ($2_2$) which ($2_2$) is linearly displaceable so that the black body radiators ($1_1$ to $1_4$) can be positioned consecutively beneath the stationary plane mirror (7).

8. An apparatus according to claim 5, wherein the at least four black body radiators ($1_1$ to $1_4$) are mounted at equal intervals adjacent each other on a bolder, said holder being pivotal through 90° and displaceable so that the individual radiators ($1_1$ to $1_4$) can be positioned consecutively opposite the aperture area of the spectrometer (6) to be calibrated.

9. An apparatus according to claim 5, wherein the radiators ($1_1$ to $1_4$) are arranged at the same distance from a spectrometer to be calibrated as an object to be measured, whereby the properties of the atmosphere are treated as properties of the spectrometer by incorporating spectral regions of high atmospheric radiation absorption into the calibration of a spectrometer.

* * * * *